(12) United States Patent
Badgerow et al.

(10) Patent No.: US 7,518,270 B2
(45) Date of Patent: Apr. 14, 2009

(54) ACCURATE MICROSTEPPING MOTOR

(75) Inventors: Richard L. Badgerow, Watsonville, CA (US); Ted T. Lin, Saratoga, CA (US)

(73) Assignee: Lin Engineering, Inc., Santa Clara, CA (US)

( * ) Notice: Subject to any disclaimer, the term of this patent is extended or adjusted under 35 U.S.C. 154(b) by 386 days.

(21) Appl. No.: 11/425,819

(22) Filed: Jun. 22, 2006

(65) Prior Publication Data

US 2007/0013237 A1    Jan. 18, 2007

Related U.S. Application Data

(60) Provisional application No. 60/699,560, filed on Jul. 15, 2005.

(51) Int. Cl.
*H02K 37/12* (2006.01)
(52) U.S. Cl. .................................. 310/49 R; 310/216
(58) Field of Classification Search ............. 310/49 R, 310/216, 156.64, 156.65
See application file for complete search history.

(56) References Cited

U.S. PATENT DOCUMENTS

| | | | |
|---|---|---|---|
| 4,025,810 A | 5/1977 | Field | 310/162 |
| 4,112,319 A | 9/1978 | Field | 310/49 R |
| 4,423,343 A | 12/1983 | Field, II | 310/49 R |
| 4,501,980 A | 2/1985 | Welburn | 310/12 |
| 4,516,048 A | 5/1985 | Brigham | 310/254 |
| 4,638,195 A | 1/1987 | Lin | 310/49 R |
| 4,642,494 A | 2/1987 | Lundin et al. | 310/49 R |
| 4,647,802 A | 3/1987 | Konecny | 310/49 R |
| 4,670,696 A | 6/1987 | Byrne et al. | 318/701 |
| 4,675,564 A | 6/1987 | Isozaki | 310/49 R |
| 4,703,243 A | 10/1987 | Ettelman et al. | |
| 4,739,201 A | 4/1988 | Brigham et al. | 310/49 R |
| 4,873,462 A | 10/1989 | Harned | 310/49 R |
| 4,910,475 A | 3/1990 | Lin | 310/49 R |
| 5,157,298 A | 10/1992 | Kawabata | 310/156 |
| 5,309,051 A | 5/1994 | Kobori | 310/49 R |
| 5,708,310 A * | 1/1998 | Sakamoto et al. | 310/49 R |
| 5,834,865 A * | 11/1998 | Sugiura | 310/49 R |
| 5,852,334 A | 12/1998 | Pengov | 310/168 |
| 6,008,561 A | 12/1999 | Tang | 310/183 |
| 6,060,809 A | 5/2000 | Pengov | 310/168 |
| 6,114,782 A | 9/2000 | Lin et al. | 310/49 R |
| 6,597,077 B2 | 7/2003 | Lin et al. | 310/49 R |
| 6,903,476 B2 * | 6/2005 | Sakamoto | 310/156.64 |
| 6,969,930 B2 | 11/2005 | Lin et al. | 310/49 R |

* cited by examiner

*Primary Examiner*—Nguyen N Hanh
(74) *Attorney, Agent, or Firm*—Schneck & Schneck; Thomas Schneck; Mark Protsik

(57) ABSTRACT

A stepper motor includes a rotor having equally spaced rotor teeth defining a full step angle, and a stator with stator poles wound with coils that can be driven in a series of phases so as to magnetically interact with the rotor to produce stepping motion. The stator poles have teeth organized into two groups when there is an even number of stator teeth per pole, or into three groups for an odd number of stator teeth per pole. The stator teeth have an average pitch different from the rotor's tooth pitch, but the groups of stator teeth are also displaced relative to other groups by a specified offset angle of one-half or one-quarter step to double the number of detent positions, and to displace such detent positions from full one-phase ON or two-phase ON positions.

24 Claims, 7 Drawing Sheets

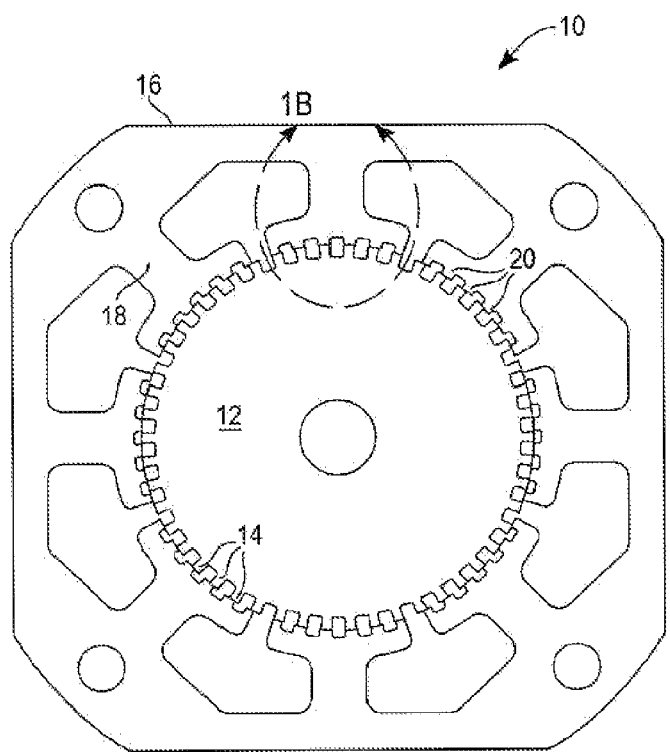
Fig._1A *(Prior Art)*
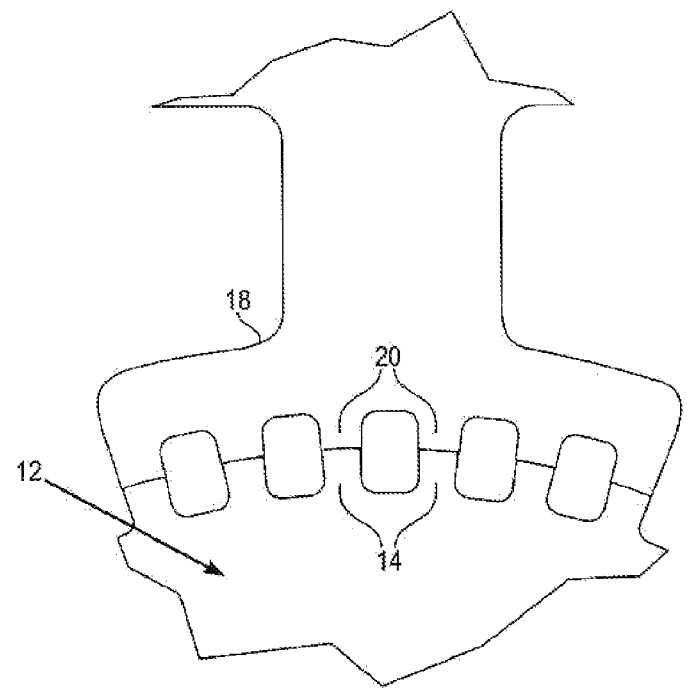
Fig._1B *(Prior Art)*

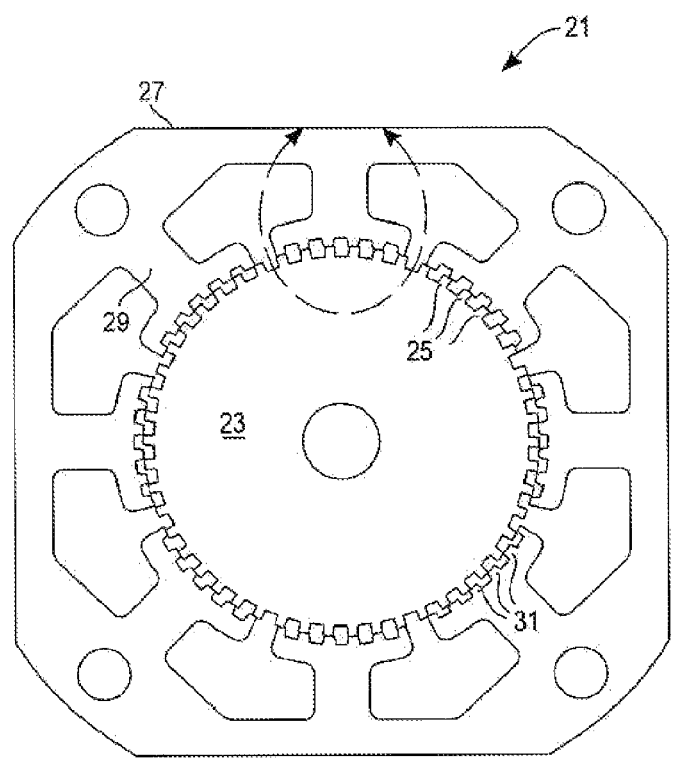
Fig._2A
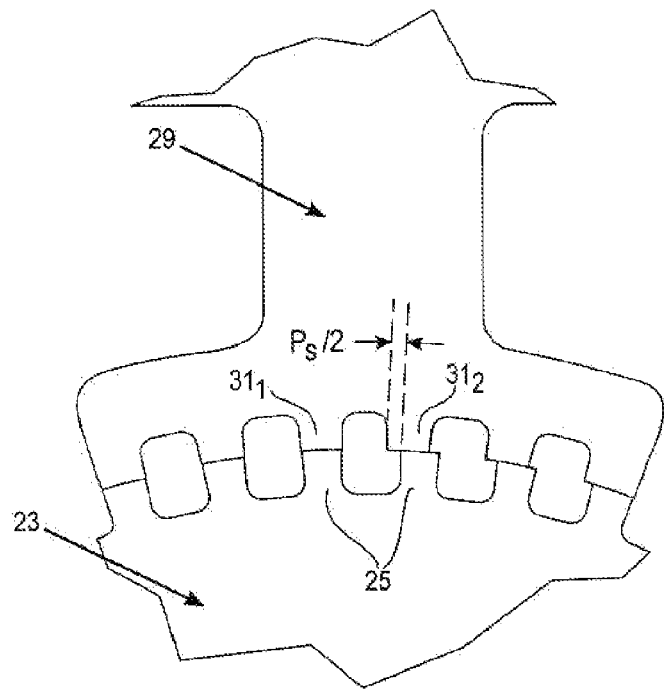
Fig._2B

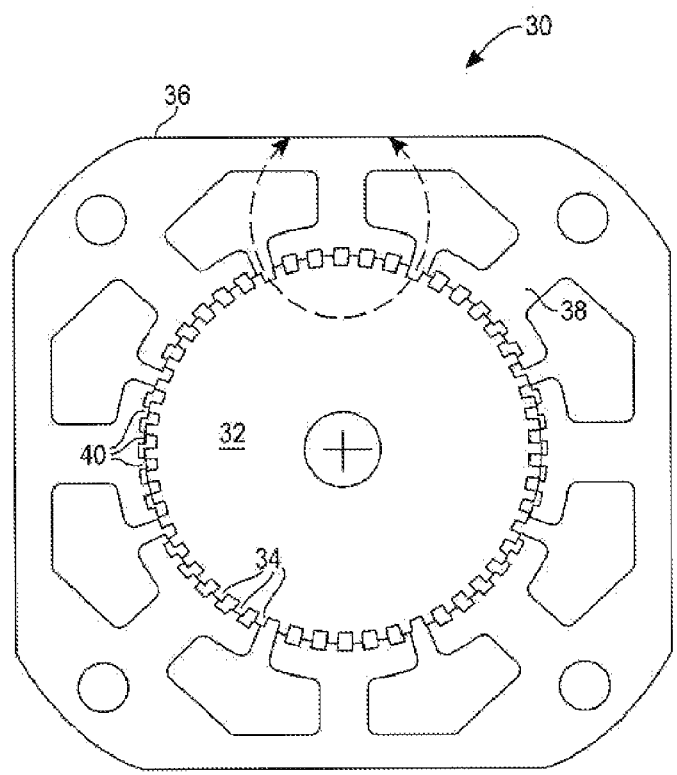
*Fig._3A*
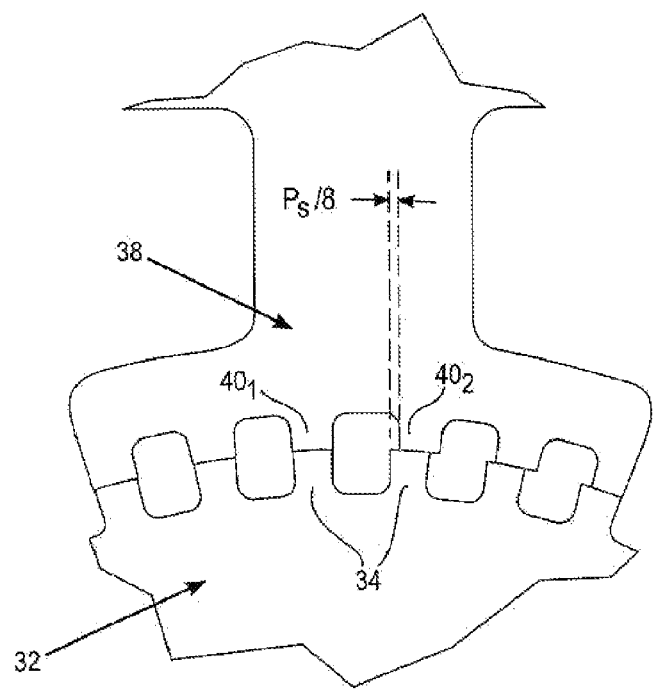
*Fig._3B*

ACCURATE MICROSTEPPING MOTOR

CROSS-REFERENCE TO RELATED APPLICATION

The present application claims priority under 35 U.S.C. 119(e) from U.S. provisional application Ser. No. 60/699,560, filed Jul. 15, 2005.

TECHNICAL FIELD

The invention relates generally to electric motor structures designed to rotate step by step, i.e., stepper motors, and in particular to arrangements, including microstepping, for smoothing out the motion, as well as arrangements for improving step accuracy.

BACKGROUND ART

Stepper motors are used in a wide variety of applications that require precise motion control, such as in printers, scanners, x-y tables, turntables, tape and disk drive systems, security cameras and other optical equipment, robotics, CNC (computer-numeric-control) machine tools, dispensers, and injector pumps. Unlike "conventional" AC or DC motors, which produce continuous rotary motion from a continuously applied input voltage, stepper motors will stay indefinitely at a particular stable "detent" position as long as the electrical power is maintained. An electrical phase change, applying power to a different set of stator coils, is required to make the motor rotate to a new stable detent position. A stepper motor's movement is made up of a series of discrete incremental rotational steps.

One goal in stepper motor design is to reduce noise and vibration caused by erratic jerking motion of the discrete steps between the successive stable detent positions. Another goal is to increase both resolution (number of steps per revolution) and accuracy of the motor positions. Other goals are to provide adequate holding torque and efficient power usage over a range of motor speeds. These various design goals are met in a variety of ways, often involving tradeoffs. For example, mechanical damping has been used to smooth out the motion, but it also adds load to the motor and cannot improve step accuracy. In U.S. Pat. No. 6,008,561 to Tang, a motor is provided with auxiliary damping windings that are coupled to form a closed current loop. The damping windings absorb energy from or provide energy to the phase windings by mutual induction. The effects of such electromagnetic damping are similar to that of mechanical damping.

Different modes of driving a steeper motor can affect both the positional resolution and smoothness of motion. For example, a microstepping mode of operation allows a full step to be divided into as many as 500 micro-steps, which provides a potential resolution on the order of 100,000 micro-steps per revolution, assuming 200 full steps per revolution in a 1.8 degree stepper motor. This microstepping is achieved by limiting the drive current that the controller sends to the groups of motor coils at each step so that the current waveforms are approximately sinusoidal instead of simply 100% on/off. The unequal pull of partially energized coils causes the rotor to assume intermediate positions between the full-step positions. Microstepping can improve the smoothness of motion for quieter operation in comparison to full-step and half-step drive modes, with some loss of torque as a tradeoff.

However, unlike the full-step positions, the micro-steps are not guaranteed to be equal in size. Because of detent torque, coil inductance, pole geometry, and other factors, even if the drive current waveform applied to the stator coils should happen to be perfectly sinusoidal in form, a perfectly linear response by the motor will generally not be achieved. In conventional designs, rotor and stator teeth are aligned where full current is applied at one-phase ON stable positions (i.e., one phase has 100% current applied to a set of stator coils, while the other phase is at a zero crossing point with 0% current applied to another set of stator coils). The rotor has greater difficultly pulling out from these stable positions, which typically results in erratic jerks in rotor motion. RMS Technologies, headquartered in Carson City, Nev., has developed its R325 drive to output a predetermined amount of optimal holding and running current into the motor to overcome the motor's detent torque and thereby substantially reduce the jerk at the stable zero crossing points for greater linearity and accuracy of motion.

The present inventor has also contributed to the advancement in stepper motors, as exemplified in prior U.S. Pat. Nos. 4,638,195; 4,910,475; 6,114,782; 6,597,077; and U.S. Pat. No. 6,969,930. In one of the aforementioned patents ('077), bifilar windings around the stator poles are connected to a driver in a manner (T-connection) different from the conventional series and parallel stator coil connections, that in addition to maximizing torque at medium speeds also smoothes stepping motion and reduces vibrations compared to the conventional connections. In another of the aforementioned patents ('930), the bifilar winding ratio is chosen (1: tan x) in order to shift the torque profile by an angle x in a half-stepping motor so that peak torque no longer coincides with one-phase ON or two-phase ON positions, resulting in smoother motion.

Other techniques have been devised to reduce torque variability in stepper motors, such as by modifying the relative dimensions or displacing the positions of one or more groups of poles in order to break rotational symmetries in motor geometry. For example, U.S. Pat. No. 5,852,334 and U.S. Pat. No. 6,060,809 to Pengov employ a rotor with alternately wide and narrow pole faces. U.S. Pat. No. 4,739,201 to Brigham et al. shows how one can reduce any harmonic of the torque/angle curve in a hydride stepper motor by displacing a first set of pole teeth from their "normal" one-half tooth pitch position relative to a second set of pole teeth by a displacement angle calculated to cancel the harmonic generated by one set with that generated by the other set. Providing a motor with different numbers of rotor and stator poles and/or teeth with correspondingly different pitches and rotational offsets with respect to each other can effectively average the magnetic field's influence on torque, as described in U.S. Pat. Nos. 4,423,343; 4,647,802; 4,675,564; 5,157,298; and U.S. Pat. No. 5,309,051. For example, in the last named ('501) patent to Kobori, the stator teeth pitch is selected relative to the rotor teeth pitch and the number of salient poles in order that the stator teeth on different poles differ in their phase relation to the rotor teeth.

While all of these various approaches achieve some degree of smoothing of stepper motion and noise reduction, the smoothing is typically accompanied by some reduction in microstepping accuracy or in holding torque, or other performance factor, as a tradeoff. It is desirable that any such tradeoffs are minimized or eliminated altogether to the extent possible.

SUMMARY DISCLOSURE

The present invention is a hybrid stepper motor in which the teeth on the stator poles are separated in groups with special pitch angles in order to rearrange the relationship between rotor and stator teeth to avoid teeth alignment at any one-phase ON or two-phase ON stable position. The pitch that is standard for all groups of stator pole teeth is $P_s=2\times\theta\times p$, where $\theta$ is the full step angle and p is the number of bipolar phases of the motor. For an even number of teeth on each stator pole, the teeth are divided into groups 1 and 2 that are separated by a special pitch angle $P_e=P_s\pm\theta/2$. For an odd number of teeth on each stator pole, the teeth are divided into groups 1, M, and 2, where groups 1 and 2 teeth are separated from group M middle teeth by a special pitch angle $P_O=P_s\pm\theta/4$. The overall effect of the stator tooth repositioning is to create an additional detent position between each of the prior phases, thereby doubling the number of detent positions and reducing the detent torque by approximately half. These detent positions are not in line with the one-phase ON or two-phase ON stable positions. The motor will more easily pass through the natural detent positions, thus providing better step accuracy and smoother motion.

BRIEF DESCRIPTION OF THE DRAWINGS

FIGS. 1A and 1B are respective plan and enlarged cutout views of a prior art stepper motor having equally spaced stator teeth.

FIGS. 2A and 2B are respective plan and enlarged cutout views of an exemplary stepper motor having an even number of stator teeth per stator pole and divided into two groups of teeth offset from one another by one-half stator pitch.

FIGS. 3A and 3B are respective plan and enlarged cutout views of another exemplary stepper motor in accord with the present invention, like that in FIGS. 2A and 2B, but with groups of stator teeth offset by one-eighth stator pitch.

DETAILED DESCRIPTION

With reference to FIGS. 1A and 1B, a typical stepper motor 10 in accord with the prior art is shown by way of comparison to the stepper motors in accord with the present invention seen in FIGS. 2A-2B, 3A-3B and 4A-4B.

Figure 8A:
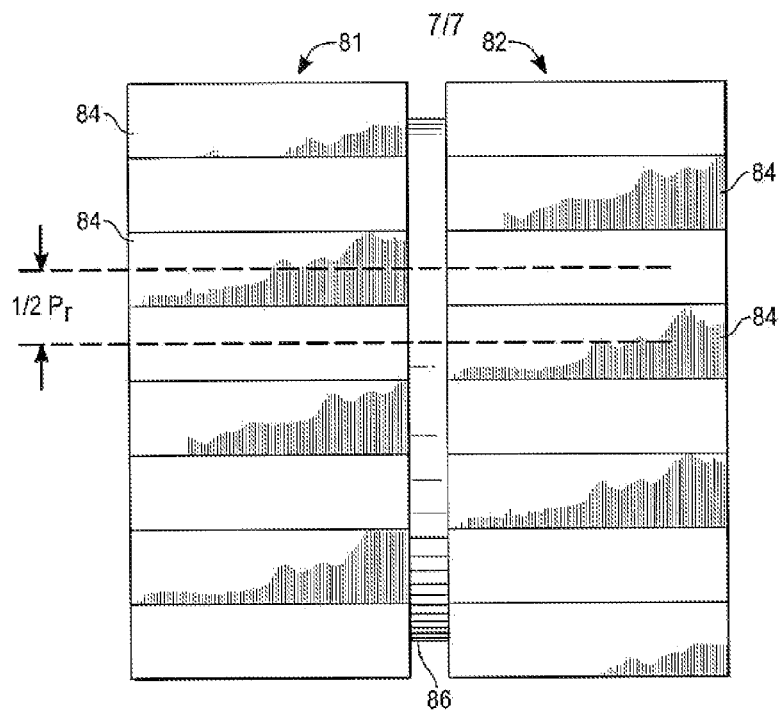
FIGS. 8A and 8B are side views of representative rotors for use in hybrid stepper motors in accord with the present invention, with respective displacements between rotor sections of ½ and ⅜ rotor tooth pitch.
Figure 8B:
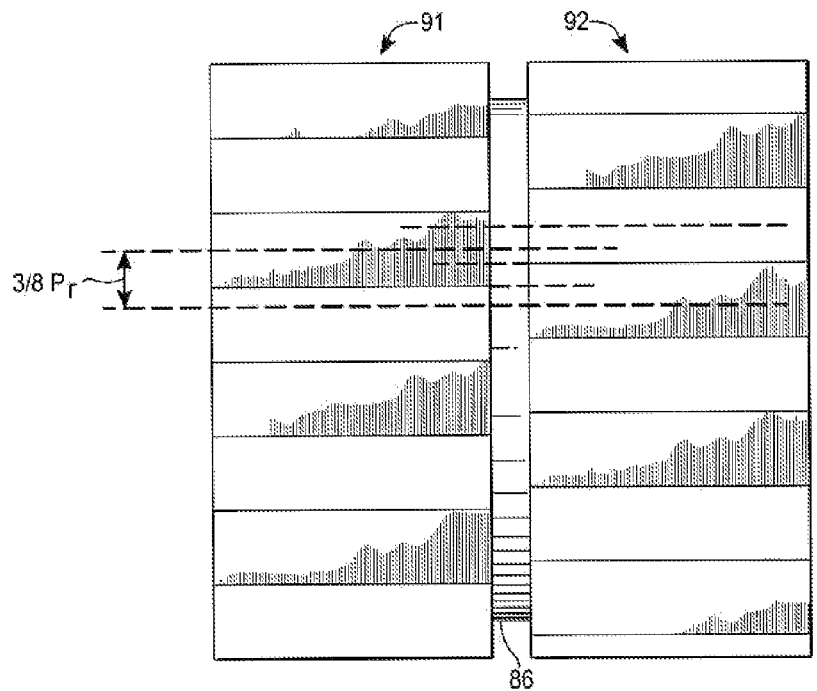

The stepper motor 10 of FIGS. 1A and 1B has a rotor 12 with evenly spaced rotor teeth 14 defining a full step angle. The stepper motor 10 may be a hybrid stepper motor, wherein the rotor 12 (see FIG. 8A) includes two axially separated rotor sections 81 and 82, each with equally spaced rotor teeth 84, and with a permanent magnet 86 between the two rotor sections 81 and 82 providing an axially aligned magnetic field to the rotor 12. In such a hybrid motor 10, the teeth on one rotor section are rotationally displaced relative to the teeth on the other rotor section, for example, by one-half step. As a result, one rotor section will display rotor teeth with a permanent south magnetic pole while the other rotor section will display rotor teeth with a permanent north magnetic pole, and the stator 16 will interact magnetically with effectively alternately north and south magnetic rotor teeth. Alternatively, as described in U.S. Pat. No. 4,739,201 to Brigham et al., the displacement between the teeth 94 in the different rotor sections 91 and 92 could be at some other angle than one-half rotor tooth pitch, e.g., ⅜ of a pitch, as shown in FIG. 8B. Also, the widths of the rotor teeth and the gaps between teeth need not be equal to each other provided the rotor teeth themselves are uniformly spaced from one another.

The stepper motor 10 also has a stator 16 with a number of stator poles 18 wound with stator coils (not shown) that can be driven in some specified series of magnetic phases. Either a bipolar or unipolar mode of driving may be used. Also, the specified series of phase may define any of several drive modes, including full-stepping, half-stepping and microstepping modes of operation, depending upon how the coils are connected to the driver.

The stator poles 18 in this conventional stepper motor 10 have evenly spaced stator teeth 20. The numbers $N_r$ of rotor teeth 14 and $N_s$ of stator teeth 20, and their respective rotor and stator teeth pitches $P_r$ and $P_s$ are typically not equal. The stator tooth pitch $P_s=2\times\theta\times p$, where $\theta$ is the fundamental full step angle and p is the number of bipolar phases (or, equivalently, half the number of unipolar phases). At each stable detent position of the stepper motor 10, there is always at least one pair of aligned rotor 14 and stator teeth 20. This is the nature of a detent position in a stepper motor. In this conventional design, the detent positions coincide with full current one-phase ON electronic phases of the motor, producing a strong detent torque. As a result, the rotor teeth 14 have difficultly pulling out of the stable detent positions, leading to jerky motion through each of the detent positions.

With reference to FIGS. 2A and 2B, another stepper motor 21 also has a rotor 23 with equally spaced rotor teeth 25. The stator poles are again wound with stator coils according to any known winding arrangement (not shown for simplicity), which can be driven according to any known pattern of drive current phases, including in a microstepping mode. However, the stator 27 has stator poles 29 organized with two distinct groups of stator teeth 31. The two groups are identified in close-up as group 1 teeth 31$_1$ and group 2 teeth 31$_2$. As in the motor 10 of FIGS. 1A and 1B, the stator teeth 31 have a standard tooth pitch angle $P_s$ that differs from the rotor pitch angle $P_r$. The group 1 teeth 31$_1$ are equally spaced from other group 1 teeth 31$_1$, and likewise, group 2 teeth 31$_2$ are equally spaced from other group 2 teeth 31$_2$. However, in this second motor 21, the group 2 teeth 31$_2$ are offset from their normal position in relation to the group 1 teeth 31$_1$ by an offset pitch angle of $P_s/2$. That is, adjacent stator teeth are alternately spaced at angles of $P_s/2$ and $3P_s/2$. The average pitch continues to be $P_s$, but not the actual teeth separations are $P_s\pm P_s/2$. This illustrates the basic principle of sorting stator teeth into distinct groups and offsetting one group relative to the other group by a predetermined offset angle.

A goal of the present invention is to choose an offset angle so that an additional detent position will be created between phases. In the present invention, this has to do with how the stator teeth are organized and positioned on the stator. Any of the prior drive modes (unipolar or bipolar, and full-stepping, half-stepping or microstepping, etc.) may continue to be used here. An advantage is especially seen when used in a microstepping mode, namely in greater microstepping accuracy, but smoother, quieter motion is also seen when driven in full-stepping or half-stepping modes. The motor 21 is preferably a hybrid stepper motor having a composite rotor (with axial magnet) as described above as an option for the conventional motor 10, but this hybrid stepper construction is not absolutely essential.

With reference to FIGS. 3A and 3B, an exemplary stepper motor 30 in accord with the present invention is seen. Like the motors in FIGS. 1A and 1B, and FIGS. 2A and 2B, the rotor 32 has equally spaced rotor teeth 34 with a rotor tooth pitch $P_r$. The number of rotor teeth $N_r$ to use is determined by the number of (unipolar) phases $N_p$ and the desired full step angle S where $N_r=360°/(N_p \times S)$, with S given in degrees and with $N_r$ and $N_p$ being integers. Note that the number of mechanical phases of a motor is the number of full steps needed to repeat the same mechanical line-up between a stator tooth and a rotor tooth $N_p$ equals this number for a unipolar motor, and is double this value for bipolar motor. That is, $N_p=3$ for a 3-phase unipolar motor, $N_p=4$ for a 2-phase bipolar motor, $N_p=10$ for a 5-phase bipolar motor, etc. For example, a 4-phase, 1.8-degree unipolar motor has $N_r=360°/(4\times1.8°)$ =50 rotor teeth. A 2-phase, 0.9-degree bipolar motor has $N_r=360°/(4\times0.9°)=100$ rotor teeth. A hypothetical 3-phase, 1.8-degree unipilar motor should have $N_r=360°/(3\times1.8°)$ =66.666 . . . rotor teeth. But since $N_r$ is not an integer in this case, no such motor exists. Such a motor with exactly 66 rotor teeth has a full-step angle $S=360°/(3\times66)=1.81818\ldots°$.

The motor 30 has a stator 36 with stator poles 38. Stator poles in this embodiment have an even number of stator teeth 40, e.g., 6 teeth per pole. The stator teeth are organized into two distinct groups of teeth, namely group 1 stator teeth $40_1$ and group 2 stator teeth $40_2$. In this exemplary embodiment, alternating stator teeth belong to the different groups, so that the arrangement forms a pattern of [1, 2, 1, 2, . . . ]. Other patterns that separate the stator teeth into two distinct groups are also possible. The stator teeth overall have the standard stator tooth pitch as an average:

$$P_s = 2 \times \theta \times p,$$

where θ is the fundamental full step angle and p is the number of bipolar phases (or half the number of unipolar phases). However, as in FIGS. 2A and 2B, the two groups of stator teeth $40_1$ and $40_2$ are offset from one another by an offset angle equal to $\theta/2=P_s/(4\times p)$. This is the offset angle selected (within manufacturing tolerances) to create the additional detent position between the phases. In the case of a two-phase motor this offset is one-eighth of the standard stator pitch $P_s$. Thus, assuming a pattern of alternating group 1 and 2 teeth, for an even number of stator teeth on a pole, the actual tooth separations $P_e$ between the two groups of stator teeth are:

$$P_e = P_s \pm \theta/2 = P_s \pm P_s/(4\times p)$$

EXAMPLE 1

A 7.2° standard stator tooth pitch angle corresponds to a 1.8° 2-phase bipolar (or 4-phase unipolar) motor, a 1.2° 3-phase bipolar (or 6-phase unipolar) motor, a 0.72° 5-phase bipolar (or 10-phase unipolar) motor, where 1.8°, 1.2°, and 0.72° refer to the full step angle θ of the respective motors. For a 1.8° 2-phase bipolar (or 4-phase unipolar) motor, the stator teeth have tooth separations $P_e$ between the two groups of stator teeth of 7.2°±1.8°/2=7.2°±0.9°; i.e., alternately 6.3° and 8.1°. For a 1.2° 3-phase bipolar (or 6-phase unipolar) motor, the stator teeth have tooth separations $P_e$ between the two groups of stator teeth of 7.2°±1.2°/2=7.2°±0.6°; i.e., alternately 6.6° and 7.8°. And for a 0.72° 5-phase bipolar (or 10-phase unipolar) motor, the stator teeth have tooth separations $P_e$ between the two groups of stator teeth of 7.2°±0.72°/2=7.2°±0.36°; i.e., alternately 6.84° and 7.56°.

Figure 4A:
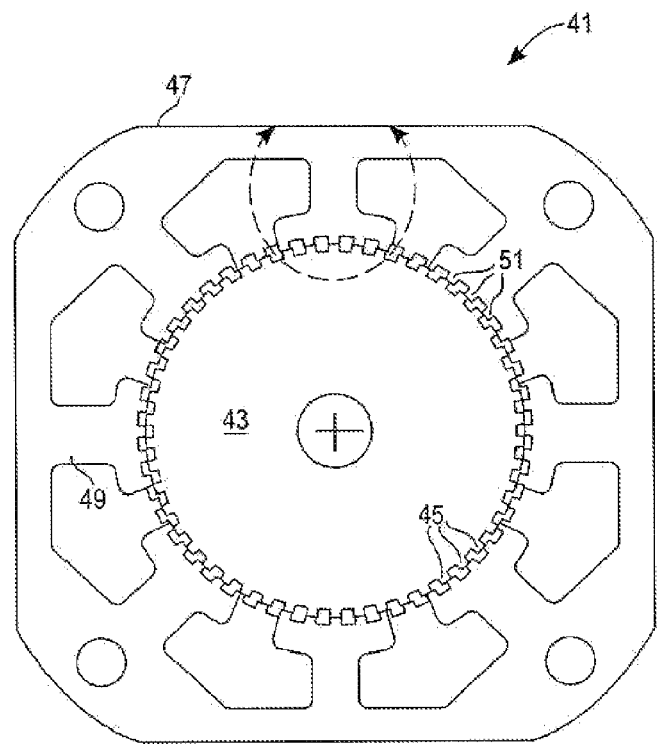
FIGS. 4A and 4B are respective plan and enlarged cutout views of yet another exemplary stepper motor but having an odd number of stator teeth per stator pole and divided itno a first group, a middle group and a second group, with the first and second groups offset from the middle group of stator teeth by one-sixteenth stator pitch.
Figure 4B:
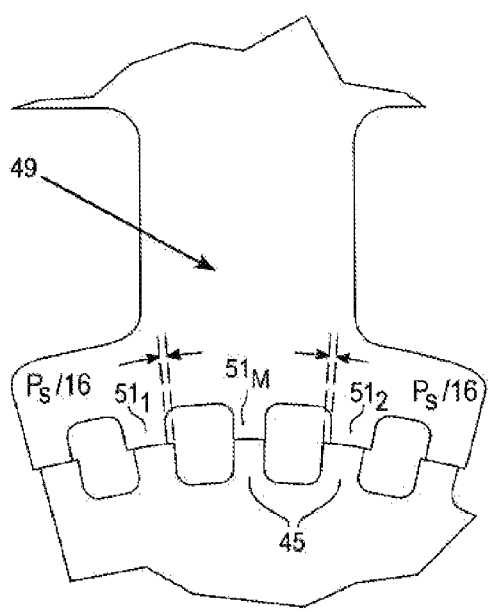

With reference to FIGS. 4A and 4B, another exemplary stepper motor 41 in accordance with the present invention is seen. Like all of the previous motors, the rotor 43 has equally spaced rotor teeth 45 with a rotor tooth pitch $P_r$. The rotor teeth have to be uniform to provide a uniform step. The motor 41 has a stator 47 with stator poles 49. Stator poles in this embodiment have an odd number of stator teeth 51, e.g., 5 teeth per pole. For this odd numbered case, the stator teeth are organized into three distinct groups of teeth, namely group 1 stator teeth $51_1$, a middle group stator teeth $51_M$, and group 2 stator teeth $51_2$. There is usually just one middle tooth $51_M$ per pole, with a pair of group 1 teeth on one side of the middle tooth and a pair of group 2 teeth on the other side of the middle tooth (i.e., an arrangement of: [1, 1, M, 2, 2]). Other tooth group patterns might be provided, with bilateral symmetry on each pole being preferred. The stator teeth overall again have the standard stator tooth pitch as an average:

$$P_s = 2 \times \theta \times p,$$

where θ is the fundamental full step angle and p is the number of bipolar phases (or half the number of unipolar phases). However, as in FIGS. 3A and 3B, groups 1 and 2 of stator teeth $51_1$ and $51_2$, are offset from the middle group $51_M$ by an offset angle equal to $\theta/4=P_s/(8\times p)$. This is the offset angle selected (within manufacturing tolerances) to create the additional detent position between the phases. In the case of a two-phase motor this offset is one-sixteenth of the standard stator pitch $P_s$. Offset positions for groups 1 and 2 teeth are determined with respect to the position any given tooth would have if it were a middle tooth. For an odd number of stator teeth on a pole, the actual tooth separations $P_o$ between the two groups of stator teeth are:

$$P_o = P_s \pm \theta/4 = P_s \pm P_s/(8\times p)$$

EXAMPLE 2

As before, a 7.2° standard stator tooth pitch angle corresponds to a 1.8° 2-phase bipolar (or 4-phase unipolar) motor, a 1.2° 3-phase bipolar (or 6-phase unipolar) motor, a 0.72° 5-phase bipolar (or 10-phase unipolar) motor, where 1.8°, 1.2°, and 0.72° refer to the full step angle θ of the respective motors. For a 1.8° 2-phase bipolar (or 4-phase unipolar) motor, the stator teeth have tooth separations $P_o$ for the three groups of stator teeth of 7.2°±0.9°/2=7.2°±0.45°=6.75° or 7.65°. For a 1.2° 3-phase bipolar (or 6-phase unipolar) motor, the stator teeth have tooth separations $P_o$ between the two groups of stator teeth of 7.2°±0.6°/2=7.2°±0.3°=6.9° or 7.5°. And for a 0.72° 5-phase bipolar (or 10-phase unipolar) motor, the stator teeth have tooth separations $P_o$ between the two groups of stator teeth of 7.2°±0.36°/2=7.2°±0.18°=7.02° or 7.38°.

Figure 5:
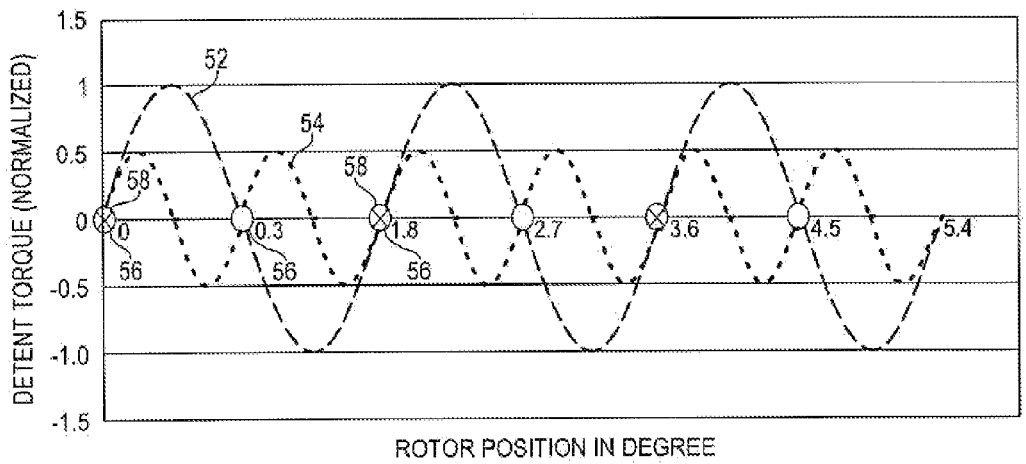
FIG. 5 is a graph of detent torque (normalized) versus rotor position (in degrees) for exemplary 1.8 degree stepper motors according to both the prior art and the present invention.

With reference to FIG. 5, the effect of the tooth offsets is to double the number of detent positions while reducing the amount of detent torque at each detent position by 50%. Curves 52 and 54 compare the detent torque for both the prior art (no offsets, i.e., equal stator tooth spacing) and for a stepper motor in accord with the present invention. For illustration purposes, the effect upon a 1.8° two-phase bipolar motor is shown. Curve 52 corresponds to the prior art. The detent torque's magnitude is normalized to a peak detent torque of one unit. Detent positions 58 at every 1.8° are marked with an X. In particular, for a conventional two-phase bipolar motor (equal stator tooth spacing), a first detent position is generated when the group 1 teeth of phase A are aligned with the rotor teeth. A second detent position is generated when the group 2 teeth of phase A are aligned with the rotor teeth. A third detent position is generated when the group 1 teeth of phase B are aligned with the rotor teeth. And, a fourth detent position is generated when the group 2 teeth of phase B are aligned with the rotor teeth. A stepper motor with 50 rotor teeth will have 200 detent positions, i.e., one position for every 1.8°.

Curve 54 corresponds to the present invention. The tooth offsets provided in the present invention reduce the detent torque magnitude by half in comparison with the conventional motor of curve 52, such that the magnitude of curve 54 now peaks at 0.5 torque unit. Further, the number of detent positions 56 are twice as many, now occurring at every 0.9°. These positions 56 are marked on the graph with an O. In particular, let the group 1 on each phase of a 2-phase bipolar motor be the phases a, b, a' and b', and let the group 2 on each phase be ab, ba', a'b', and b'a. There are then eight natural detent positions that match eight stable positions of phase a, ab, b, ba', a', a'b', b', and b'a, respectively. A 1.8° stepper motor (with 50 rotor teeth) will then have 400 detent positions, two detents per full step, i.e., one every 0.9°. Each detent provides only half as much detent torque on the rotor teeth as the conventional motor.

Figure 6A:
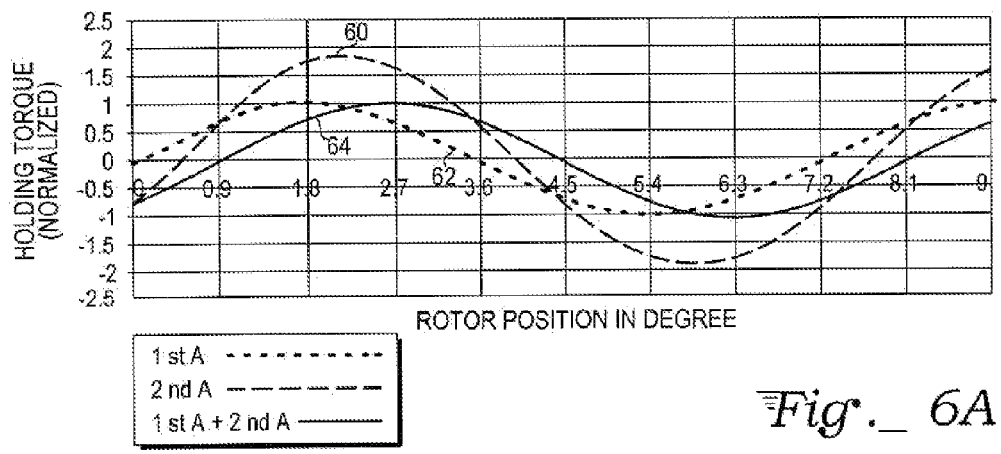
FIGS. 6A and 6B are graphs of holding torque (normalized) versus rotor position (in degrees) for an exemplary 1.8 degree stepper motor in accord with the present invention showing that respective one-phase ON and two-phase ON positions are not in line with the natural detent positions in the present invention.
Figure 6B:
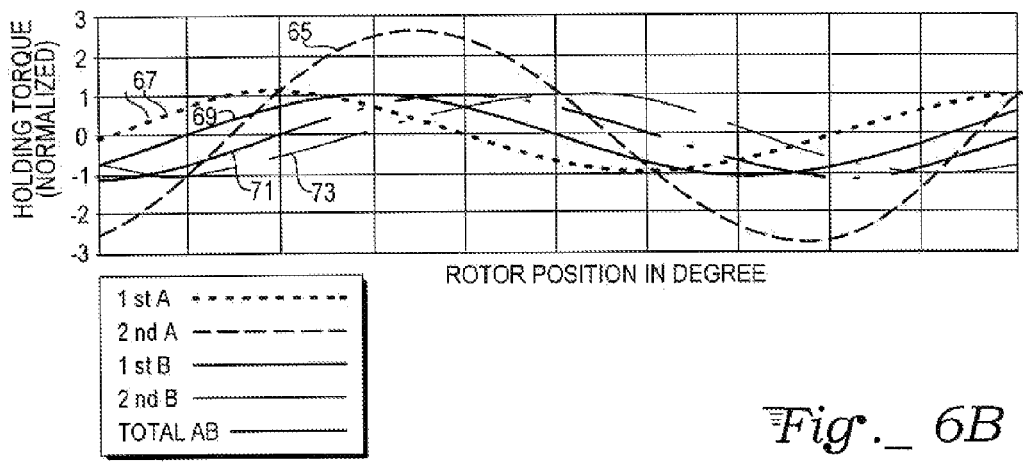

Turning now from the detent torque to the holding torque, FIGS. 6A and 6B show that the true one-phase ON and two-phase ON stable positions are not aligned with the natural detent positions. The holding torque magnitude is normalized with respect to the component phases (curves 62 and 64, and curves 67, 69, 71, and 73). The holding torque 60 of a one-phase ON phase results from a combination of the holding torques 62 and 64 from the offset groups of stator teeth. The stable position of the resulting torque of the true phase A ON is between phases a and ab. The stable position of the resulting torque of the true phase B ON is between b and ba'. FIG. 6A shows that the stable position of one-phase ON is located at 0.45°, while the natural detent position is located at 0.9°. Likewise, the stable position of the resulting torque of true phase AB ON is a combination of phases a and ab, b and ba', which is 3ba. FIG. 6B shows the combination of contributors 67, 69, 71, and 73 to the two-phase ON holding torque 65. The natural detent position is again located at 0.9°, while the stable position for two-phase ON is located at 1.35°.

Figure 7:
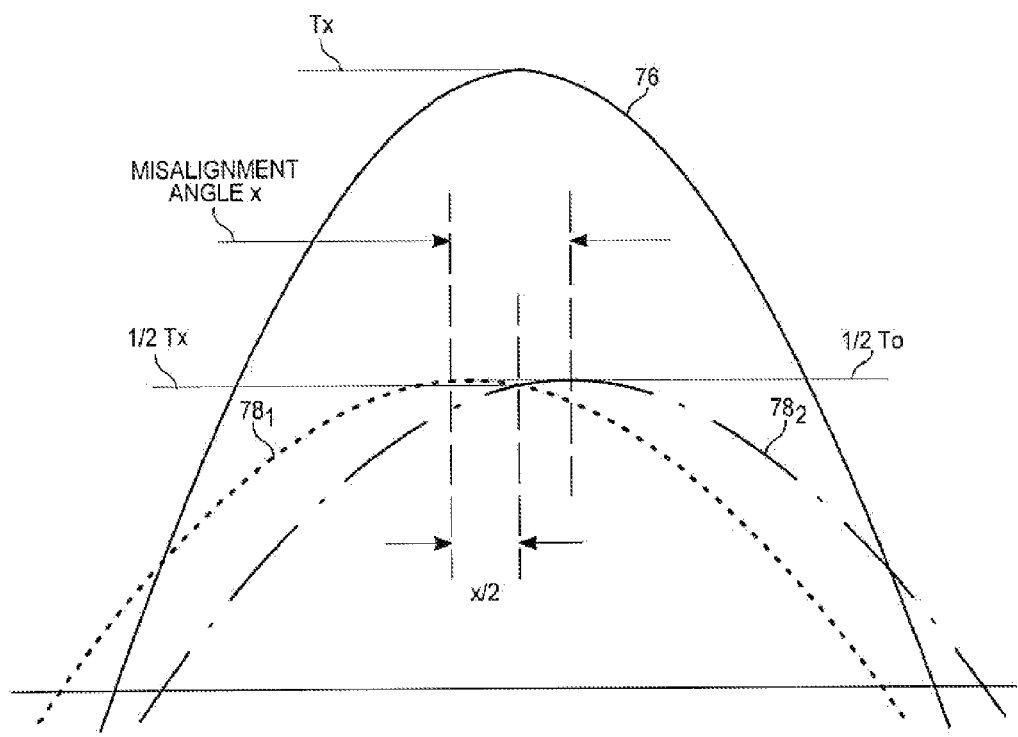
FIG. 7 is a graph showing a close-up view of one-half cycle of holding torque versus rotor position illustrating the contributions of two groups of stator teeth to overall holding torque.

With reference to FIG. 7, the energized torque is contributed by the two sets of stator teeth being related to the rotor teeth. For an even number of teeth on the stator pole, the conventional design developed a torque of $T_s = n \times T \sin(pN \times \theta/2)$, where n is the even number of teeth per pole, N is the number of rotor teeth, $\theta$ is the fundamental full step angle, p is the number of bipolar phases, and T is the maximum holding torque developed between stator and rotor teeth. In the present invention with an even number of teeth per pole (FIGS. 3A and 3B), the resulting torque is:

$$T_e = n/2 \times T \sin[pN \times \theta/2] + n/2 \times T \sin[pN(\theta + \theta/2)/2]$$
$$= n \times T \cos[pN \times \theta/8] = n \times T \cos(22.5°)$$
$$= 0.924 T_s$$

The two contributions on the first line result from the respective group 1 and group 2 stator teeth and are shown as curves $78_1$ and $78_2$ in FIG. 7. The resulting torque is shown as curve 76.

For an odd number of teeth on each stator pole, the conventional motor develops a torque $T_s = m \times T \sin(pN \times \theta/2)$, where m is the odd number of teeth per pole. In the present invention (FIGS. 4A and 4B), the developed torque is:

$$T_o = (m-1)/2 \times T \sin[pN \times (\theta - \theta/4)/2] + T \sin[pN \times \theta/2] +$$
$$(m-1)/2 \times T \sin[pN \times (\theta + \theta/4)/2]$$
$$= (m-1) \times T \cos[pN \times \theta/8] + T \sin[pN \times \theta/2]$$
$$= [0.924(m-1)T_s] + T_s$$

The torque contributions on the top two lines are from the respective group 1, middle, and group 2 stator teeth, This particular equation assumes a single middle tooth per stator pole and equal numbers of group 1 and group 2 teeth. The torque equation will be suitably modified for other selected patterns of stator teeth.

The present invention with its stator teeth displaced as described herein provides a stepper motor having less detent torque at each stable detent position and developing a holding torque whose peaks do not align with the stable positions, thereby producing smoother stepping motion and more accurate microstepping.

The invention claimed is:

1. A stepper motor, comprising:
   a rotor having a plurality of equally spaced rotor teeth, the number of rotor teeth together with a specified number of phases defining a full step angle; and
   a stator with a plurality of stator poles wound with coils that can be driven in a series of phases so as to magnetically interact with the rotor, each stator pole having a specified number of stator teeth with an average stator tooth pitch different than a pitch of the equally spaced rotor teeth, wherein the stator teeth are organized into at least two groups of stator teeth with at least one of said groups displaced relative to another of said groups by a specified offset angle, wherein there is an even number of stator teeth on each stator pole and the stator teeth are organized into two groups, the specified offset angle being one-half of a full step angle.

2. The stepper motor as in claim 1, wherein the rotor comprises two rotor sections with a permanent magnet between the rotor sections providing an axially aligned magnetic field, each of the rotor sections having equally spaced rotor teeth, the teeth of one rotor section being displaced from the teeth of the other rotor section, whereby the stepper motor is a hybrid stepper motor.

3. The stepper motor as in claim 1, wherein the average stator tooth pitch $P_s$ is defined as $P_s = 2 \times \theta \times p$, where $\theta$ is a full set angle and p is a number of bipolar phases or half of a number of unipolar phases driving said stator poles.

4. A stepper motor, comprising:
   a rotor having a plurality of equally spaced rotor teeth, the number of rotor teeth together with a specified number of phases defining a full step angle; and
   a stator with a plurality of stator poles wound with coils that can be driven in a series of phases so as to magnetically interact with the rotor, each stator pole having a specified number of stator teeth with an average stator tooth pitch different than a pitch of the equally spaced rotor teeth, wherein the stator teeth are organized into at least two groups of stator teeth with at least one of said groups displaced relative to another of said groups by a specified offset angle, wherein there is an odd number of stator teeth on each stator pole and the stator teeth are organized into three groups including a middle group and two other groups, the specified offset angle being one-fourth of a full step angle and defining a displacement of teeth in the other two groups relative to the middle group.

5. The stepper motor as in claim 4, wherein the rotor comprises two rotor sections with a permanent magnet between the rotor sections providing an axially aligned magnetic field, each of the rotor sections having equally spaced rotor teeth, the teeth of one rotor sections being displaced from the teeth of the other rotor section, whereby the stepper motor is a hybrid stepper motor.

6. The stepper motor as in claim 4, wherein the average stator tooth pitch $P_s$ is defined as $P_s = 2 \times \theta \times p$, where $\theta$ is a full step angle and p is a number of bipolar phases or half of a number of unipolar phases driving said stator poles.

7. A hybrid stepper motor, comprising:
a rotor having two rotor sections with a permanent magnet between the rotor sections providing an axially aligned magnetic field, each of the rotor sections having equally spaced rotor teeth, the teeth of one rotor section being displaced from the teeth of the other rotor section, the number of rotor teeth together with a specified number of phases defining a full step angle; and
a stator with a plurality of stator poles that can be driven in a series of phases so as to magnetically interact with the rotor, each stator pole having a specified number of stator teeth with an average stator tooth pitch different than a pitch of the equally spaced rotor teeth, wherein the stator teeth are organized into at least two groups of stator teeth with at least one of said groups displaced relative to another of said groups by an offset angle chosen such that detent positions of the rotor are displaced from full one-phase ON and two-phase ON positions of the rotor, wherein there is an even number of stator teeth on each stator pole and the stator teeth are organized into two groups, the chosen offset angle being one-half of a full step angle.

8. The stepper motor as in claim 7, wherein the stator teeth of a first group alternate with stator teeth of a second group on each stator pole.

9. The stepper motor as in claim 7 constructed as a two-phase bipolar motor.

10. The stepper motor as in claim 7 constructed as a three-phase bipolar motor.

11. The stepper motor as in claim 7 constructed as a five-phase bipolar motor.

12. The stepper motor as in claim 7 constructed as a unipolar motor.

13. The stepper motor as in claim 7, wherein the average stator tooth pitch $P_s$ is defined as $P_s = 2 \times \theta \times p$, where $\theta$ is a full step angle and p is a number of bipolar phases or half of a number of unipolar phases driving said stator poles.

14. The stepper motor as in claim 7, wherein the teeth of one rotor section are displaced from the teeth of the other rotor section by one-half rotor tooth pitch.

15. The stepper motor as in claim 7, wherein the teeth of one rotor section are displaced from the teeth of the other rotor section by three-eighths rotor tooth pitch.

16. A hybrid stepper motor, comprising:
a rotor having two rotor sections with a permanent magnet between the rotor sections providing an axially aligned magnetic field, each of the rotor sections having equally spaced rotor teeth, the teeth of one rotor section being displaced from the teeth of the other rotor section, the number of rotor teeth together with a specified number of phases defining a full step angle; and
a stator with a plurality of stator poles that can be driven in a series of phases so as to magnetically interact with the rotor, each stator pole having a specified number of stator teeth with an average stator tooth pitch different than a pitch of the equally spaced rotor teeth, wherein the stator teeth are organized into at least two groups of stator teeth with at least one of said groups displaced relative to another of said groups by an offset angle chosen such that detent positions of the rotor are displaced from full one-phase ON and two-phase ON positions of the rotor, wherein there is an odd number of stator teeth on each stator pole and the stator teeth are organized itno three groups including a middle group and two other groups, the chosen offset angle being one-fourth of a full step angle and defining a displacement of teeth in the other two groups relative to the middle group.

17. The stepper motor as in claim 16, wherein the middle group consists of a single tooth on each stator pole, with teeth of a first group situated on one side of the tooth of the middle group and teeth of a second group situated on an opposite side of the tooth of the middle group on each stator pole.

18. The stepper motor as in claim 16 constructed as a two-phase bipolar motor.

19. The stepper motor as in claim 16 constructed as a three-phase bipolar motor.

20. The stepper motor as in claim 16 constructed as a five-phase bipolar motor.

21. The stepper motor as in claim 16 constructed as a unipolar motor.

22. The stepper motor as in claim 16, wherein the average stator tooth pitch $P_s$ is defined as $P_s = 2 \times \theta \times p$, where $\theta$ is a full step angle and p is a number of bipolar phases or half of a number of unipolar phases driving said stator poles.

23. The stepper motor as in claim 16, wherein the teeth of one rotor section are displaced from the teeth of the other rotor section by one-half rotor tooth pitch.

24. The stepper motor as in claim 16, wherein the teeth of one rotor section are displaced from the teeth of the other rotor section by three-eighths rotor tooth pitch.

* * * * *